United States Patent

[11] 3,580,350

| | | |
|---|---|---|
| [72] | Inventor | Zora Arkus-Duntov |
| | | Grosse Pointe Shores, Mich. |
| [21] | Appl. No. | 793,311 |
| [22] | Filed | Jan. 23, 1969 |
| [45] | Patented | May 25, 1971 |
| [73] | Assignee | General Motors Corporation |
| | | Detroit, Mich. |

[54] VEHICLE POWER UNIT AND DRIVE TRAIN
7 Claims, 5 Drawing Figs.

[52] U.S. Cl. .................................................. 180/44,
74/665, 74/700, 180/55, 180/70
[51] Int. Cl. ............................................... B60k 5/04,
B60k 17/34
[50] Field of Search .......................................... 180/44, 42,
55, 54, 54.4, 70

[56] References Cited
UNITED STATES PATENTS

| | | | |
|---|---|---|---|
| 1,855,642 | 4/1932 | Masury ......................... | 180/54(.4)X |
| 2,249,035 | 7/1941 | Peterson et al. ............. | 180/54(.4) |
| 2,420,581 | 5/1947 | Bacon ........................... | 180/54(.4)X |
| 3,213,958 | 10/1965 | Muller .......................... | 180/42X |
| 3,401,763 | 9/1968 | Rolt .............................. | 180/44 |
| 3,407,893 | 10/1968 | Hill et al. ....................... | 180/44 |
| 3,489,237 | 1/1970 | Van Winsen et al. .......... | 180/42X |

*Primary Examiner*—A. Harry Levy
*Attorneys*—J. L. Carpenter and Robert J. Outland ABSTRACT: Arrangements for a vehicle power unit and drive train including a transversely mounted engine having a transmission mounted along one side thereof and a differential mounted along the other side. Power transfer means connect one end of the engine and transmission and may include a fluid coupling or torque converter, drive chain and mechanical clutch. A drive shaft passing under the engine crankshaft and preferably through the oil pan member drivably connects the transmission and differential. Alternative four-wheel drive arrangements provide a second drive shaft connected to a second differential with suitable differential or slip permitting drive means between the transmission and the two drive shafts.

PATENTED MAY 25 1971 3,580,350

INVENTOR.
Zora Arkus-Duntov
BY
Robert J. Outland
ATTORNEY

INVENTOR.
Zora Arkus-Duntov
BY
Robert J. Outland
ATTORNEY

3,580,350

VEHICLE POWER UNIT AND DRIVE TRAIN

FIELD OF THE INVENTION

This invention relates to power units and drive trains especially for automotive vehicles and more particularly to compact arrangements of power train units including a transversely mounted engine and adapted for either two- or four-wheel drive.

SUMMARY OF THE INVENTION

The present invention provides a compact power unit and drive train arrangement including an engine, transmission and differential with various connecting means which may be mounted together as an assembly and which are primarily adapted for mounting with the engine disposed transversely of the vehicle. Various alternatives include provision for either two- or four-wheel drive and the use of differentials or fluid couplings to provide for speed variations between front and rear drive shafts. Provision for a clutch and/or a fluid coupling or torque converter between the engine and transmission are included as well as transfer means which may be of the chain or belt type.

Particularly compact arrangements are contemplated when using V-type engines in that the transmission and differential may be mounted on opposite sides of a crankshaft enclosing member which serves as an oil pan. A drive shaft between the transmission and differential may extend through the oil pan member and closely under the crankshaft. In such an arrangement, both the transmission and the differential are located partially under the opposite cylinder banks of the engine adding to the compactness of the unit. The mechanical clutch and fluid coupling as well as the power transfer chain or other means are located at one end of the engine and transmission assembly.

Further advantages and possible modifications of the inventive concepts disclosed will be apparent from the following description of several preferred embodiments taken together with the accompanying drawings.

DESCRIPTION OF THE PREFERRED EMBODIMENTS

Figure 1:
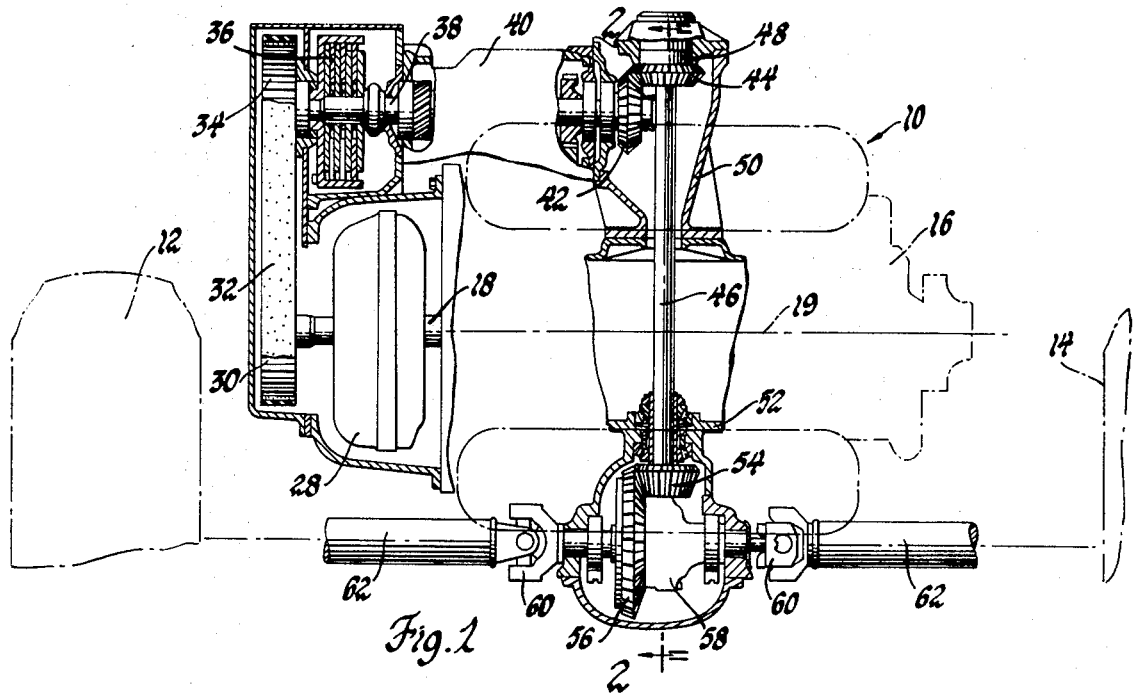
FIG. 1 is a plan view, partially in section, of a preferred embodiment of power unit and drive train arrangement formed according to the invention.
Figure 2:
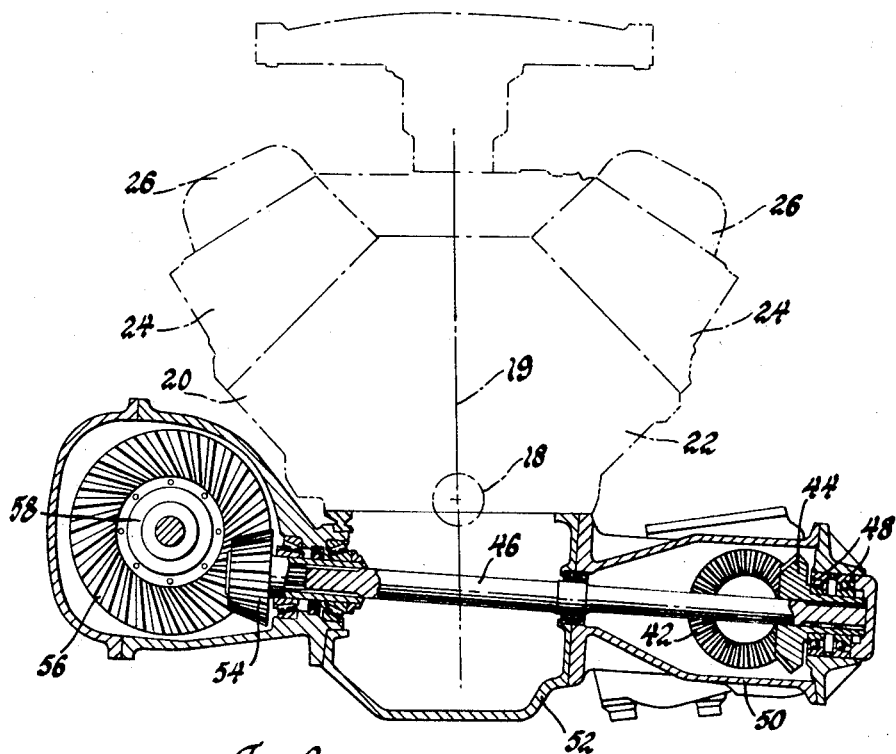
FIG. 2 is a transverse cross-sectional view taken generally in the plane indicated by the line 2-2 of FIG. 1.
Figure 3:
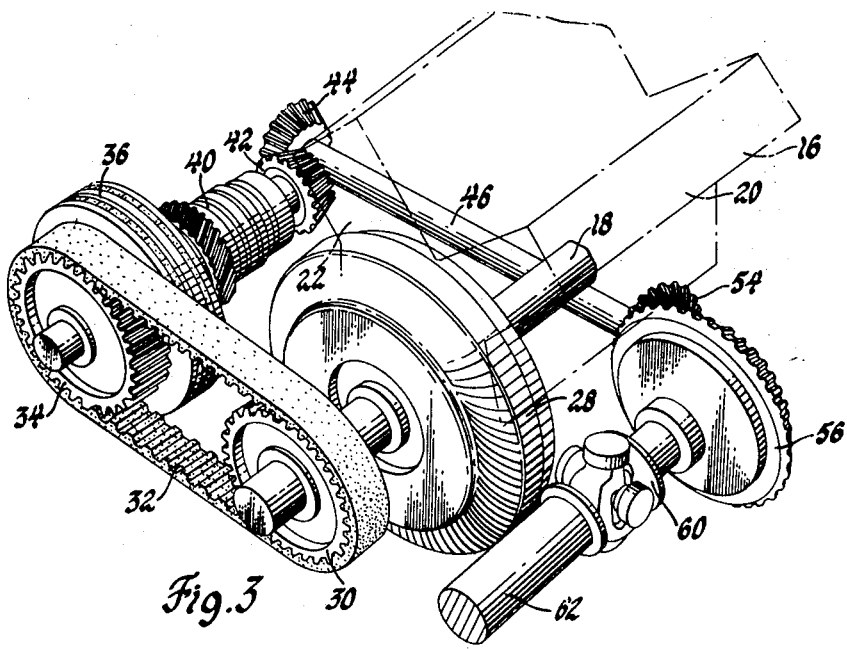
FIG. 3 is a pictorial view somewhat schematic in nature further illustrating the arrangement of components in FIGS. 1 and 2.

Referring generally to FIGS. 1 through 3 of the drawings, numeral 10 generally indicates an automotive vehicle having a pair of rear drive wheels 12 and 14, respectively, carried by a vehicle body, not shown. Supported on the body by means, not shown, are a power unit and portions of a drive train including a V-type internal combustion engine 16 having a crankshaft 18 extending longitudinally thereof along a vertical plane 19. The engine is disposed transversely of the vehicle, the longitudinal centerline of which may be assumed to pass midway between the wheels 12 and 14.

The engine includes a pair of oppositely disposed cylinder banks 20 and 22 on each of which is mounted a cylinder head 24 and a valve cover 26.

At one end of the engine is carried a hydraulic torque converter 28 driveably secured to the end of the crankshaft 18. Since a primary purpose of the converter is to absorb shock loads, it may, if desired, be replaced by a fluid coupling or dispensed with entirely in certain instances.

Outboard of the torque converter is a sprocket or pulley 30 which connects to a power transfer chain or belt 32 that in turn connects with a driven sprocket or pulley 34. The latter sprocket connects with a multiple plate mechanical clutch 36 which may be manually or automatically actuated, as desired, and the clutch in turn connects with the input shaft 38 of a change gear transmission 40 which may be either manually or automatically controlled. The transmission is mounted along one side of the engine so that its input shaft 38 is parallel to and spaced from the crankshaft 18.

The transmission has an output which connects through bevel gears 42 and 44 with a drive shaft 46 which is supported at one end by bearings 48 in a housing 50 which assists in supporting the transmission 40 and is mounted on one side of an engine frame member 52. Member 52 encloses the lower portion of the crankshaft and acts as an oil pan.

Drive shaft 46 extends through frame member 52, passing closely beneath the engine crankshaft 18 and out through the other side of frame member 52 where it connects through a hypoid pinion gear 54 with the ring gear 56 of a differential 58 which may, if desired, be of the limited slip type.

Differential 58 drives a pair of output members 60 which act as yokes for universal joints and are arranged coaxially on an axis spaced from and parallel to the engine crankshaft 18. Members 60 connect through universally jointed drive axles 62 with the vehicle wheels 12 and 14. The arrangement is extremely compact in that both the differential 58 and the transmission 40 are in part located beneath the engine cylinder banks 20, 22 and their connecting cylinder heads, all of these members, including the clutch 36, torque converter 28 and transfer chain 32, being connected together in an assembly which is mounted on the vehicle frame. Therefore, the only unsprung members of the described components are the wheels 12, 14 and the drive axles 62. Also, portions of the transmission 40 and differential 58 are seen to be located closer to vertical plane 19 than are the extreme portions of the cylinder banks 20, 22 and cylinder heads 24.

Figure 4:
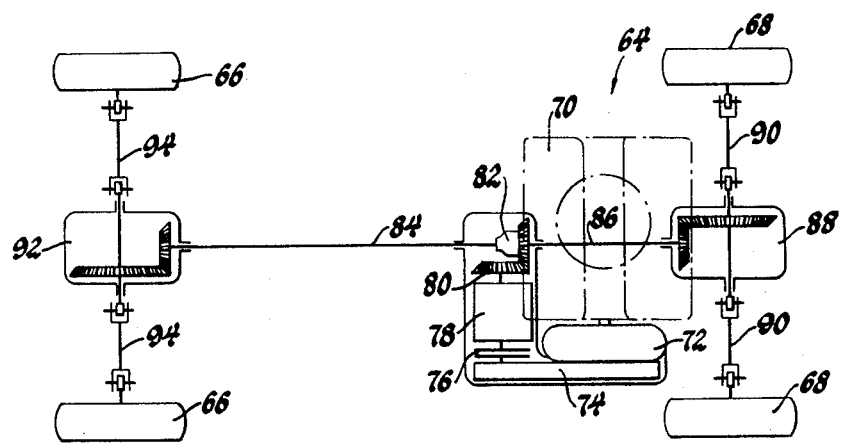
FIG. 4 is a diagrammatic plan view of an alternative embodiment of the present invention installed in a vehicle arranged for four-wheel drive.

Referring now to FIG. 4, an alternative embodiment is disclosed including provision for four-wheel drive. A vehicle, generally indicated by numeral 64, includes front and rear pairs of drive wheels 66 and 68, respectively. The vehicle body, not shown, mounts a power unit including an engine 70, torque converter 72, power transfer means 74, clutch 76 and transmission 78, which are arranged in a manner generally similar to the same components of FIGS. 1 through 3.

The output of transmission 78 connects through a bevel gear 80 with a differential drive 82, which in turn connects with front and rear drive shafts 84 and 86, respectively. The rear drive shaft 86 may pass through the oil pan portion of the engine as in the embodiments of FIGS. 1 through 3. The rear drive shaft then connects through a differential 88 with drive axles 90 extending transversely of the vehicle and connecting with the rear pair of drive wheels 68. The front drive shaft connects with a front differential 92 which in turn connects through drive axles 94 with the front pair of drive wheels 66. Any or all of the differentials may, if desired, be of the limited slip type.

Figure 5:
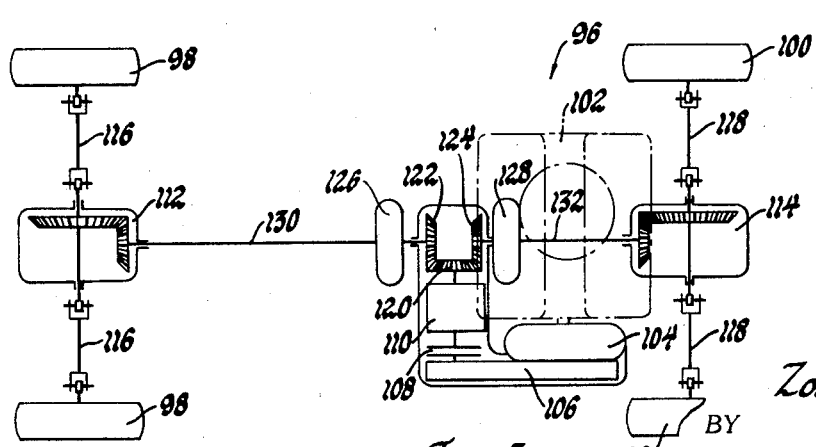
FIG. 5 is a plan view showing a different embodiment of the present invention also installed in a vehicle including four-wheel drive.

Referring now to FIG. 5, another embodiment of four-wheel drive engine and power train arrangement is shown in a vehicle generally indicated by numeral 96. This vehicle includes front and rear pairs of drive wheels 98 and 100, respectively, as well as an engine 102, torque converter 104, transfer chain 106, clutch 108 and transmission 110, all of which are arranged similarly to the comparable parts of the arrangement of FIG. 4. Also included are front and rear differentials 112 and 114 which connect to the front and rear drive wheels by front and rear pairs of drive axles 116 and 118, respectively, in a manner similar to the arrangement of FIG. 4.

The primary difference in these constructions is that the output of transmission 110 drives through a bevel gear 120 into forward and rear bevel gears 122 and 124 which connect respectively with front and rear fluid couplings or torque converters 126 and 128, respectively. Coupling 126 connects through a front drive shaft 130 with differential 112 while coupling 128 connects through a rear drive shaft 132 with differential 114. The rear drive shaft 132 may, if desired, pass through the oil pan portion of the engine as in the embodiment of FIGS. 1 through 3 or, if desired, it may be arranged to pass below the oil pan.

In all of the above arrangements, the engine is transversely mounted and drives through a torque converter and chain to a manual clutch which connects with a transmission mounted alongside the engine. The drive is then through gears and one of various types of means to front and/or rear differentials and thence to the one or two pairs of drive wheels.

When a single pair of drive wheels is utilized, a direct gear drive between the transmission and the drive shaft which passes under the engine crankshaft is satisfactory. When, however, a four-wheel drive arrangement is used, some means must be utilized to provide for differences in speed between the front and rear drive shafts. Two such arrangements are shown here, one being the differential 82 of FIG. 4, and the other being the fluid couplings 126, 128 of FIG. 5.

While the disclosures of FIGS. 1 through 3 show a rear drive arrangement, with the engine ahead of the rear wheels, it should be obvious that the power unit could equally well be placed in the front of a vehicle to drive the front wheels with the engine arranged slightly behind them. All versions of the arrangement show the compact construction afforded by placing the transmission along one side of the engine and one of the differentials along the other side preferably with the differential and transmission being attached to the lower portion of the engine and partially beneath the opposite banks thereof. The compactness is further attained by passing the drive shaft close to the engine crankshaft and preferably through the oil pan member.

Although the disclosed embodiments show body mounted front and rear differentials connected by unjointed drive shafts with the power unit and by universally jointed drive axles with the vehicle wheels, it would also be possible to arrange one or both differentials in a solid axle housing with unjointed drive axles and provide universally jointed drive shafts to connect the differentials with the power unit. Numerous other changes could also be made within the scope of the inventive concepts disclosed and such changes should be considered as encompassed within this invention.

I claim:

1. A power unit for a vehicle, said power unit comprising
an engine having a crankshaft extending longitudinally thereof and two cylinder banks arranged on opposite sides of a plane passing through said crankshaft, said engine being adapted for mounting transversely of such vehicle,
a variable ratio transmission mounted along one side of said engine and having an input shaft spaced from and parallel with said crankshaft,
power transfer means at one end of said engine and driveably connecting said crankshaft with said transmission input shaft,
a drive shaft connected with the output of said transmission, said drive shaft extending transversely of and closely adjacent said crankshaft within the enclosure therefor and passing through the walls of said engine to the other side thereof and
a differential unit on said engine other side and connected with said drive shaft, said differential unit having a pair of oppositely extending output members coaxially arranged for rotation on an axis spaced from and parallel to said engine crankshaft, said output members each being connectable with a drive wheel of said vehicle,
said transmission and said differential being located generally adjacent said cylinder banks and on opposite sides of said crankshaft plane, both said transmission and said differential having portions thereof located closer to said plane than are the extreme portions of the engine supported by said cylinder banks.

2. The power unit of claim 1 and further including clutch means in said power transfer means and adapted to disconnect the driveable connection.

3. The power unit of claim 1 and further including a fluid coupling in said power transfer means to reduce the transmission of shock forces.

4. The power unit of claim 1 wherein said cylinder banks are arranged in a "V" and said drive shaft is disposed on the side of the crankshaft opposite from said cylinder banks.

5. In a vehicle, a power unit and drive train comprising
an engine mounted transversely in said vehicle and having a crankshaft extending longitudinally of said engine,
a variable ratio transmission mounted along one side of said engine and having an input shaft spaced from and parallel to said crankshaft,
power transfer means at one end of said engine and driveably connecting said crankshaft with said transmission input shaft,
a drive shaft connected with the output of said transmission, said drive shaft extending transversely underneath said crankshaft to the other side of said engine,
a differential on the other side of said engine and connected with said drive shaft, said differential having a pair of oppositely extending output members coaxially arranged for rotation on an axis spaced from and parallel to said engine crankshaft and
means connecting each of said output members with a drive wheel of said vehicle, said drive wheels being laterally disposed on opposite sides of said vehicle,
a second drive shaft connected with the output of said transmission, said second drive shaft extending generally oppositely from said first named drive shaft and away from said engine,
a second differential connected with the outboard end of said second drive shaft, said second differential having a pair of oppositely extending output members arranged on an axis transverse to said vehicle and
means connecting each of the output members of said second differential with a drive wheel of said vehicle, said drive wheels being laterally disposed on opposite sides of said vehicle.

6. In a vehicle, a power unit and drive train as defined in claim 5 and further including a third differential having an input member connected with said transmission and a pair of output members, one being connected with each of said first and second drive shafts.

7. In a vehicle, a power unit and drive train as defined in claim 5 and further including a fluid coupling connected between said transmission and each of said first and second drive shafts to provide for a variation in speed therebetween.